(12) United States Patent
Yoda et al.

(10) Patent No.: US 12,292,325 B2
(45) Date of Patent: May 6, 2025

(54) DETECTION SYSTEM, DETECTION DEVICE, AND DETECTION METHOD

(71) Applicant: NEC Corporation, Tokyo (JP)

(72) Inventors: Yukihide Yoda, Tokyo (JP); Naoto Ogura, Tokyo (JP); Yoshiaki Aono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 296 days.

(21) Appl. No.: 17/781,446

(22) PCT Filed: Dec. 9, 2020

(86) PCT No.: PCT/JP2020/045753
§ 371 (c)(1),
(2) Date: Jun. 1, 2022

(87) PCT Pub. No.: WO2021/117749
PCT Pub. Date: Jun. 17, 2021

(65) Prior Publication Data
US 2023/0010341 A1 Jan. 12, 2023

(30) Foreign Application Priority Data

Dec. 13, 2019 (JP) ................. 2019-225541

(51) Int. Cl.
G01H 9/00 (2006.01)
(52) U.S. Cl.
CPC .................. *G01H 9/004* (2013.01)

(58) Field of Classification Search
USPC ........................................ 73/655
See application file for complete search history.

(56) References Cited

FOREIGN PATENT DOCUMENTS

| CN | 208044156 U | * 11/2018 | |
|---|---|---|---|
| JP | 2000-230935 A | 8/2000 | |
| JP | 2007-024798 A | 2/2007 | |
| JP | 2017-053751 A | 3/2017 | |
| JP | 2018-114792 A | 7/2018 | |
| WO | WO-2019022084 A1 | * 1/2019 | ............. G01D 5/353 |

OTHER PUBLICATIONS

International Search Report for PCT Application No. PCT/JP2020/045753, mailed on Feb. 22, 2021.
English translation of Written opinion for PCT Application No. PCT/JP2020/045753, mailed on Feb. 22, 2021.

* cited by examiner

Primary Examiner — Clayton E. LaBalle
Assistant Examiner — Warren K Fenwick

(57) ABSTRACT

In order to provide a detection device that is capable of detecting the submersion of a fiber-optic cable in water before water penetrates the interior of the fiber-optic cable, a detection system 1 comprises: a vibration-detecting fiber-optic cable 20; a receiving means 11 that receives an optical signal including vibrations detected by the fiber-optic cable 20; and a detection means 12 that detects submersion of the fiber-optic cable in water on the basis of the vibrations included in the optical signal.

9 Claims, 13 Drawing Sheets

Fig.8

| PROPAGATION TIME PERIOD t | DISTANCE OF OPTICAL FIBER FROM DETECTION DEVICE | SECTION | THRESHOLD VALUE (nm) |
|---|---|---|---|
| t1≤t≤t2 | A km ~ B km | A | 20 |
| t2≤t≤t3 | B km ~ C km | B | 15 |
| t3≤t≤t4 | C km ~ D km | C | 10 |

Fig.11

| PROPAGATION TIME PERIOD t | DISTANCE OF OPTICAL FIBER FROM DETECTION DEVICE | COUPLING PORTION |
|---|---|---|
| t5≦t≦t6 | F m ~ G m | A |
| t7≦t≦t8 | H m ~ I m | B |
| t9≦t≦t10 | J m ~ K m | C |
| t11≦t≦t12 | L m ~ M m | D |

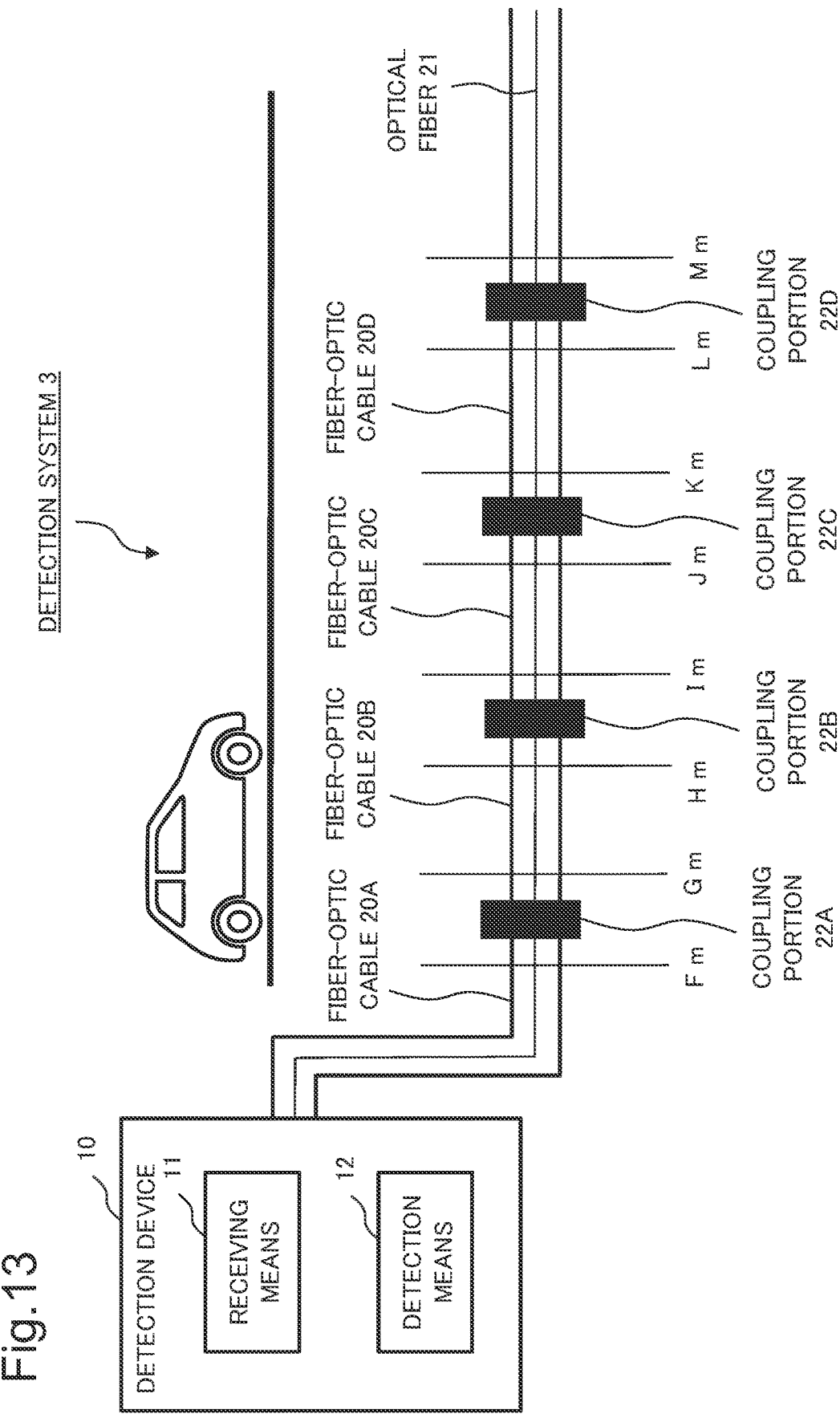

DETECTION SYSTEM, DETECTION DEVICE, AND DETECTION METHOD

This application is a National Stage Entry of PCT/JP2020/045753 filed on Dec. 9, 2020, which claims priority from Japanese Patent Application 2019-225541 filed on Dec. 13, 2019, the contents of all of which are incorporated herein by reference, in their entirety.

TECHNICAL FIELD

The present invention relates to a detection system, a detection device, and a detection method that enable detection of submersion of a fiber-optic cable.

BACKGROUND ART

There is known an optical fiber sensing technique for monitoring a surrounding environment of an optical fiber by using the optical fiber as a sensor. Depending on a monitoring target, the optical fiber is laid outdoors in the optical fiber sensing technique. For example, PTL 1 discloses that entry of a train to a station is detected by an optical fiber laid along a railroad. Further, a technique relating to optical fiber sensing is described in PTL 2.

CITATION LIST

Patent Literature

[PTL 1] Japanese Unexamined Patent Application Publication No. 2018-114792
[PTL 2] Japanese Unexamined Patent Application Publication No. 2017-053751

SUMMARY OF INVENTION

Technical Problem

When an optical fiber is laid outdoors, a fiber-optic cable protecting the optical fiber is submersed in rain water or the like. Due to long-term submersion, there may be a risk that water enters the inside of the fiber-optic cable through a fusion splicing point or the like of the fiber-optic cable. When water enters the inside of the fiber-optic cable, the optical fiber installed inside is exposed to the water, which may cause degradation of the optical fiber. Thus, it is preferred that submersion be detected before entry of water to the inside of the fiber-optic cable. However, in the techniques disclosed in PTL 1 and PTL 2, it is impossible to detect submersion of the fiber-optic cable before entry of water to the inside of the fiber-optic cable.

The present invention has been made in view of the above-mentioned problem, and an object of the present invention is to provide a detection device capable of detecting submersion of a fiber-optic cable before entry of water to the inside of the fiber-optic cable.

Solution to Problem

A detection system according to the present invention includes:
a fiber-optic cable that detects vibration;
a receiving means for receiving an optical signal including the vibration detected by the fiber-optic cable; and
a detection means for detecting submersion of the fiber-optic cable, based on the vibration included in the optical signal.

Further, a detection device according to the present invention includes:
a receiving means for receiving an optical signal including vibration detected by a fiber-optic cable; and
a detection means for detecting submersion of the fiber-optic cable, based on the vibration included in the optical signal.

Further, a detection method according to the present invention includes:
detecting vibration by a fiber-optic cable;
receiving an optical signal including the vibration detected by the fiber-optic cable; and
detecting submersion of the fiber-optic cable, based on the vibration included in the optical signal.

Advantageous Effects of Invention

According to the present invention, submersion of the fiber-optic cable can be detected before entry of water to the inside of the fiber-optic cable.

BRIEF DESCRIPTION OF DRAWINGS

FIG. 8 is a diagram for describing a detection system according to the second example embodiment of the present invention.
FIG. 11 is a diagram for describing the detection system according to the third example embodiment of the present invention.
FIG. 13 is a diagram for describing the detection system according to the third example embodiment of the present invention.

EXAMPLE EMBODIMENT

First Example Embodiment

Figure 1:
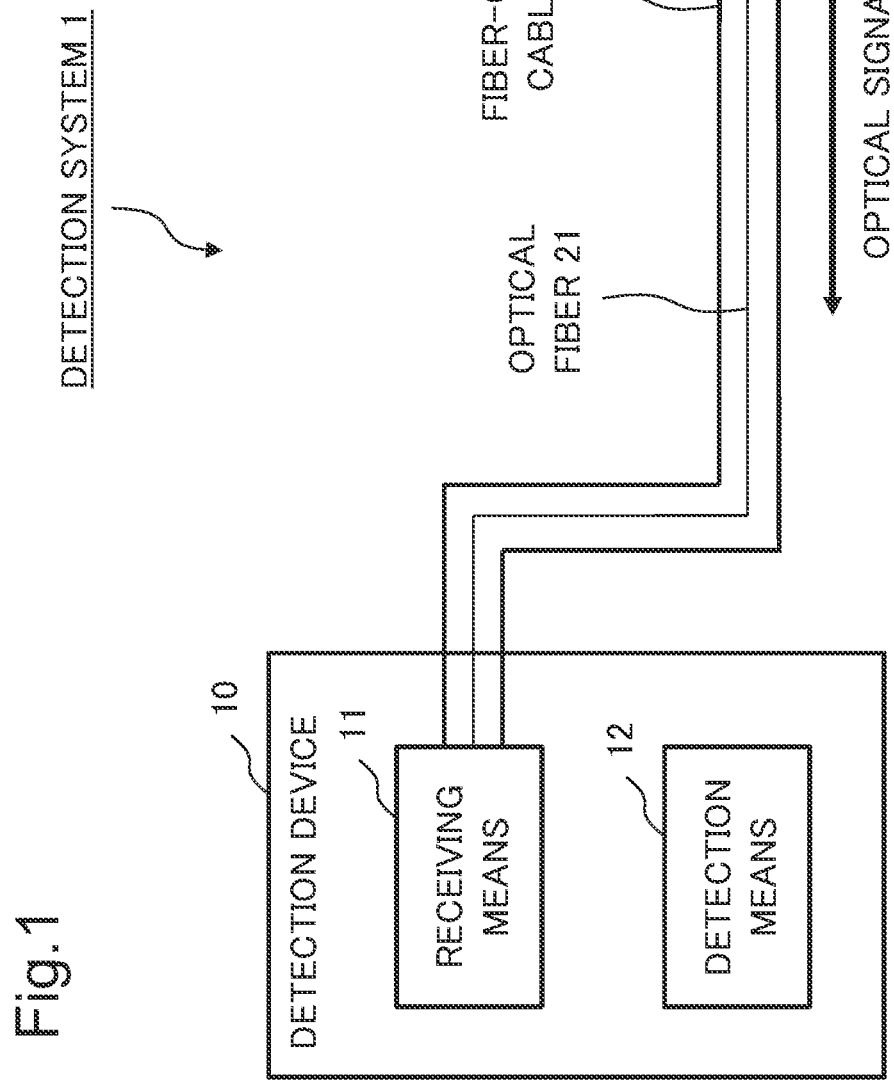
FIG. 1 is a block diagram illustrating a configuration example of a detection system according to a first example embodiment of the present invention.

A detection system 1 according to a first example embodiment is described with reference to FIG. 1. FIG. 1 is a block diagram illustrating a configuration example of the detection system 1.

The detection system 1 detects submersion of a fiber-optic cable 20. The detection system 1 includes a detection device 10 and the fiber-optic cable 20.

As illustrated in FIG. 1, the detection device 10 includes a receiving means 11 and a detection means 12. The receiving means 11 receives an optical signal including vibration detected by the fiber-optic cable 20. For example, the optical signal is backscattering light (for example, Rayleigh scattering light) generated from pulse light propagating in an optical fiber 21 in the fiber-optic cable 20, at each position in the optical fiber 21. For example, the pulse light is output from a light source (not illustrated) included in the detection device 10 to the fiber-optic cable 20.

The detection means 12 detects submersion of the fiber-optic cable 20, based on the vibration included in the optical signal. A detection method for submersion, which is performed by the detection means 12, is described later in detail.

The fiber-optic cable 20 detects the vibration. Specifically, the fiber-optic cable 20 detects the vibration with the optical fiber 21 included inside of the fiber-optic cable 20. Optical characteristics (for example, a phase) of backscattering light that is generated at a certain position in the optical fiber 21 changes according to the vibration applied to the position. The optical fiber 21 outputs the backscattering light having optical characteristics according to the detected vibration to the receiving means 11. By analyzing the optical characteristics of the backscattering light received by the receiving means 11, the detection means 12 is capable of acquiring information (for example, amplitude) relating to the vibration at the position at which the backscattering light is generated in the optical fiber 21. The optical signal including the vibration indicates an optical signal having optical characteristics according to the detected vibration.

A part of the fiber-optic cable 20 is exposed to air before submersion. Thus, after submersion, such part of the fiber-optic cable 20 is exposed to water instead of air. An attenuation amount of vibration in water is smaller than an attenuation amount of vibration in air, and hence the vibration applied to the fiber-optic cable 20 is less attenuated when submersion occurs. In other words, vibration is more likely to propagate in water than in air. By utilizing the above-mentioned property that the vibration applied to the fiber-optic cable 20 is increased due to occurrence of submersion, the detection means 12 detects occurrence of submersion when the amplitude of the vibration included in the optical signal exceeds a threshold value, for example.

The vibration is applied from a vibration source to the fiber-optic cable 20. For example, the vibration may be travelling sound from a train, vibration generated along construction at a construction site, and alarm sound from an alarm at a railroad crossing.

Figure 2:
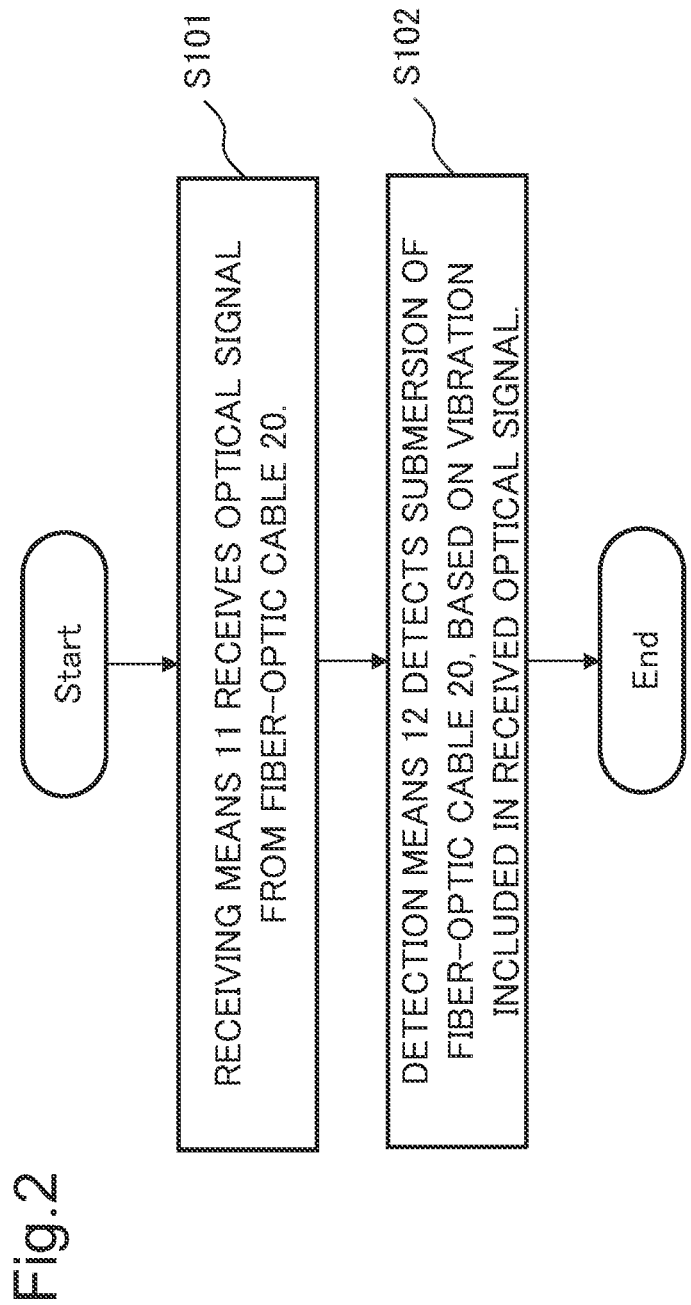
FIG. 2 is a diagram for describing an operation example of a detection system according to the first example embodiment of the present invention.

Next, with reference to FIG. 2, an operation of the detection system 1 is described.

The receiving means 11 receives the optical signal from the fiber-optic cable 20 (S101).

The detection means 12 detects submersion of the fiber-optic cable, based on the vibration included in the received light (S102). For example, when magnitude of the vibration included in the optical signal exceeds a predetermined threshold value, the detection means 12 detects submersion.

Note that, in the operation of the detection system 1, a plurality of optical signals may be received by repeating the processing in S101 for a plurality of times. In this case, in the processing in S102, submersion is detected when the vibration having magnitude equal to or greater than the predetermined threshold value is detected predetermined times or more.

The operation example of the detection system 1 is described above.

In this manner, in the detection system 1, the fiber-optic cable 20 detects the vibration. Further, the receiving means 11 receives the optical signal including the vibration detected by the fiber-optic cable 20. Further, the detection means 12 detects submersion of the fiber-optic cable 20, based on the vibration included in the optical signal.

In this manner, in the detection system 1, submersion of the fiber-optic cable 20 is detected based on the vibration detected by the fiber-optic cable 20. Therefore, submersion of the fiber-optic cable 20 can be detected when the fiber-optic cable 20 is submersed. Thus, the detection system 1 is capable of detecting submersion of the fiber-optic cable 20 before water enters the inside of the fiber-optic cable 20.

Next, a detection system 1A is described. The detection system 1A is a first modification example of the detection system 1. The detection system 1A includes a configuration similar to the configuration of the detection system 1 illustrated in FIG. 1. The detection system 1A is different from the detection system 1 in view of the operation. The detection system 1 detects submersion, based on magnitude of the vibration, whereas the detection system 1A detects submersion, based on an increase of the vibration.

Figure 3:
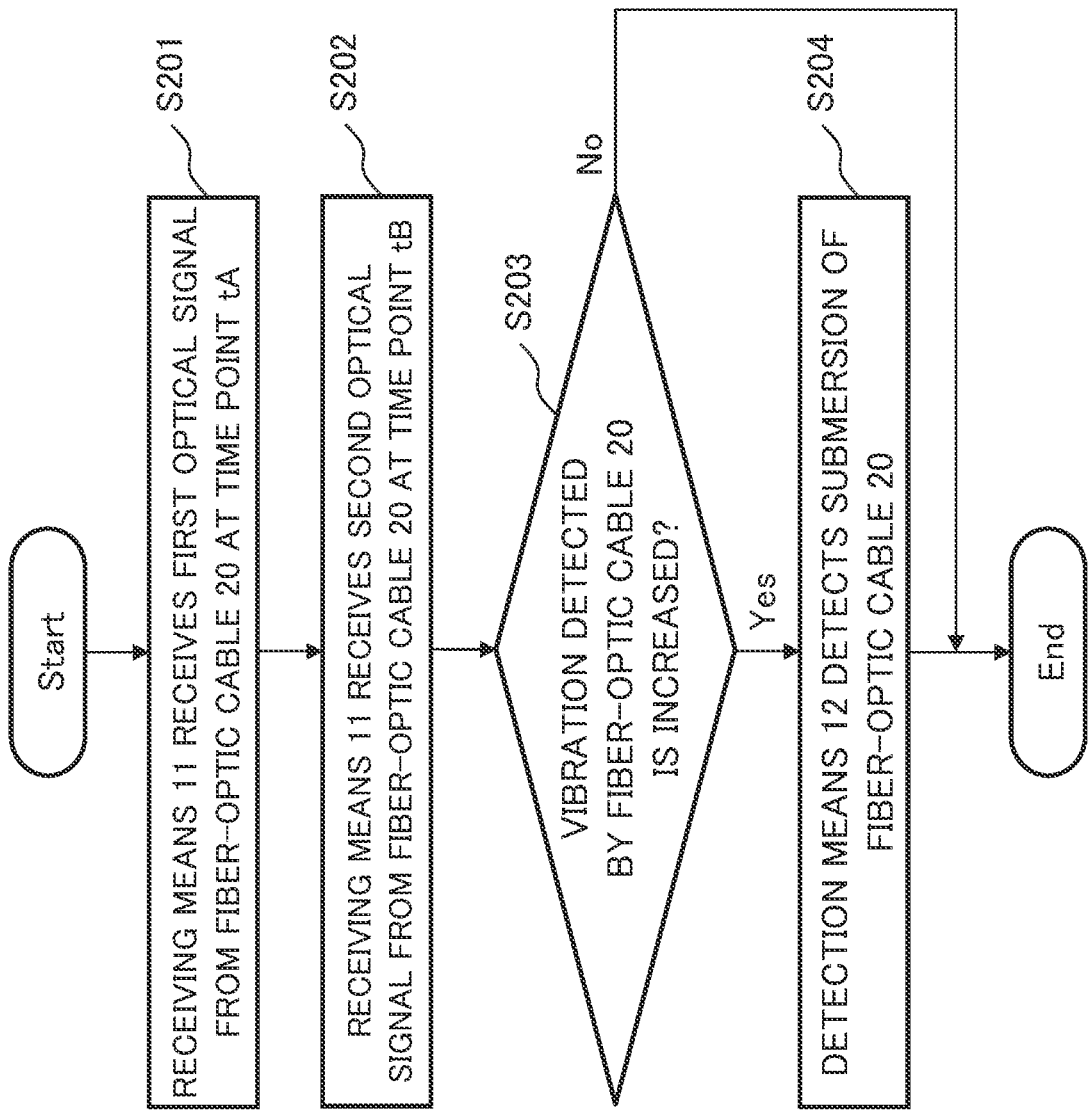
FIG. 3 is a diagram for describing an operation example of the detection system in a modification example of the first example embodiment of the present invention.

With reference to FIG. 3, an operation of the detection system 1A is described. At the time point when the operation is started, it is assumed that the light source (not illustrated) outputs first pulse light to the fiber-optic cable 20.

The receiving means 11 receives a first optical signal (backscattering light) that is generated from the first pulse light, from the fiber-optic cable 20 at a time point tA (S201). After the processing in S201, it is assumed that the light source (not illustrated) outputs second pulse light to the fiber-optic cable 20.

The receiving means 11 receives, at a time point tB after the time point tA, a second optical signal (backscattering light) that is generated from the second pulse light, from the fiber-optic cable 20 (S202).

The detection means 12 determines whether the vibration detected by the fiber-optic cable 20 is increased (S203). Specifically, when the vibration indicated with the second optical signal is equal to or greater than the vibration indicated with the first optical signal by a predetermined threshold value, the detection means 12 determines that the vibration is increased.

When it is determined that the vibration is increased (Yes in S203), the detection means 12 detects submersion of the fiber-optic cable 20 (S204).

When it is not determined that the vibration is increased (No in S203), the detection means 12 does not detect submersion of the fiber-optic cable 20. In this case, the detection means 12 may repeat the processing in S203 again by using vibration included in an optical signal that is generated from pulse light output after the second pulse light and the vibration included in the second optical signal.

In this manner, in the detection system 1A, the detection means 12 detects submersion of the fiber-optic cable 20, based on an increase of the vibration detected by the fiber-optic cable 20.

As described above, the vibration applied to the fiber-optic cable 20 is less attenuated when submersion occurs. Thus, the detection system 1A is capable of detecting submersion more accurately by detecting submersion of the fiber-optic cable 20, based on an increase of the vibration detected by the fiber-optic cable 20.

Next, a detection system 1B is described. The detection system 1B is a second modification example of the detection system 1. The detection system 1B includes a configuration similar to the configuration of the detection system 1 illustrated in FIG. 1. The detection system 1 detects submersion, based on the vibration detected by the fiber-optic cable 20, whereas the detection system 1B detects submersion of the fiber-optic cable 20, based on vibration having a specific vibration pattern from the vibration detected by the fiber-optic cable 20.

It is assumed that the detection means 12 in the detection system 1B stores a specific pattern in advance. The specific pattern is a pattern (for example, frequency characteristics) used for specifying reference vibration from the vibration applied to the fiber-optic cable 20.

Figure 4:
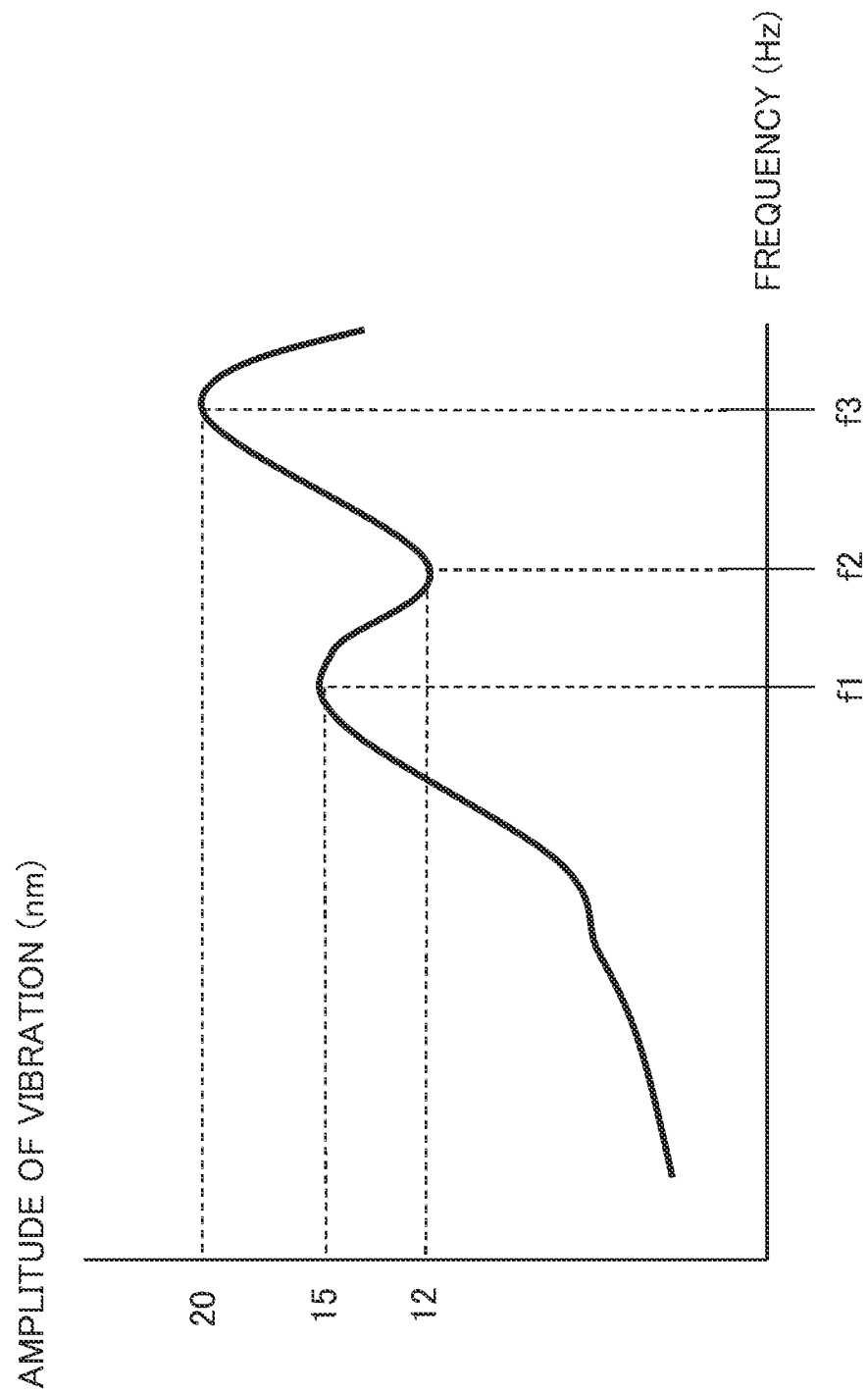
FIG. 4 is a diagram for describing an operation example of the detection system in a modification example of the first example embodiment of the present invention.

For example, when a travelling sound of a train is utilized as a reference, the detection means 12 acquires in advance frequency characteristics of vibration that is applied to the fiber-optic cable 20 before submersion due to the travelling sound of the train. FIG. 4 is a diagram illustrating one example of frequency characteristics of an amplitude of measured vibration. In this example, relative values (f1:0.75, f2:0.6) of an amplitude (15 nm) of a frequency f1 and an amplitude (12 nm) of a frequency f2 with respect to an amplitude (20 nm) of a frequency f3 are stored as the specific pattern.

Figure 5:
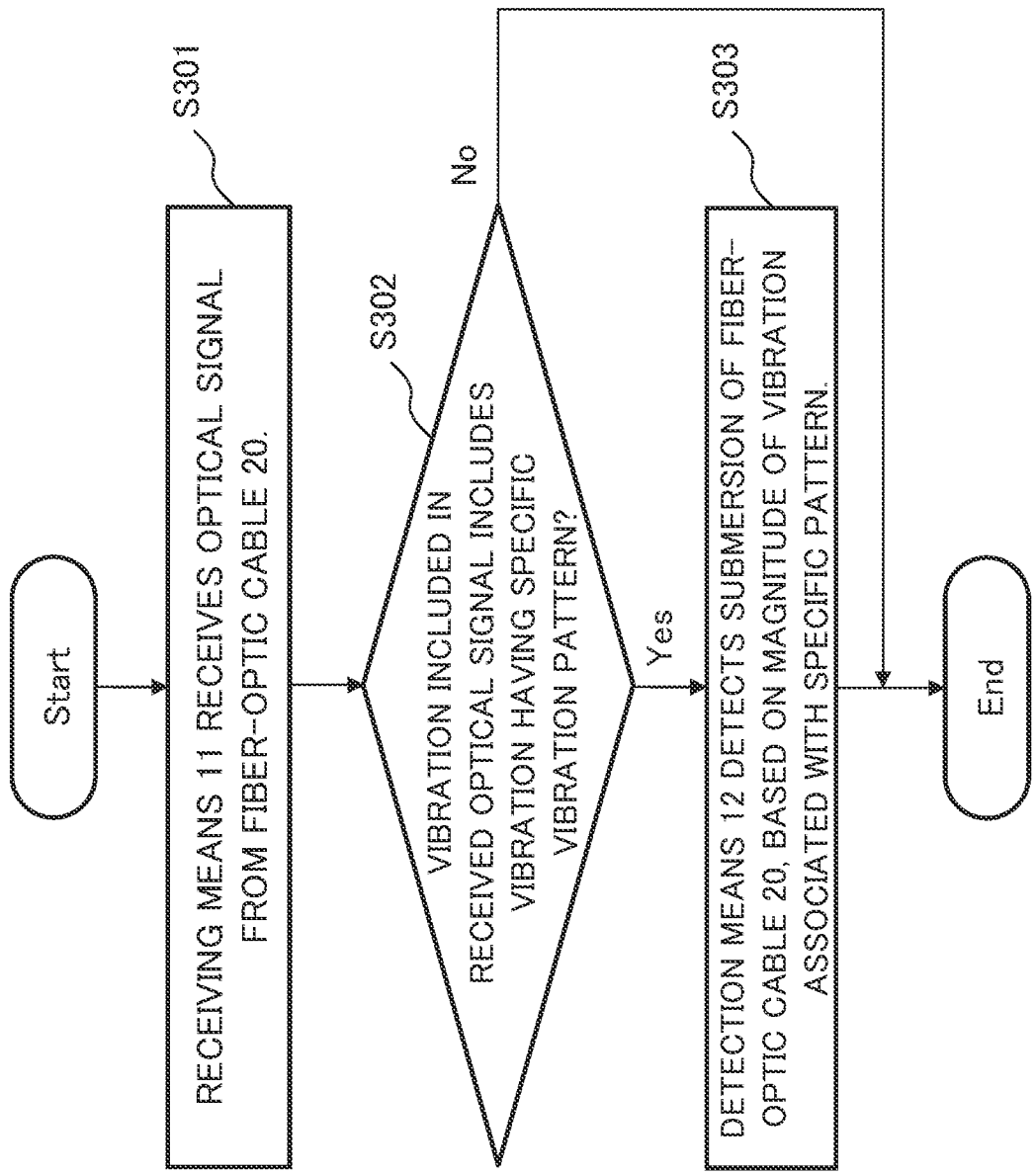
FIG. 5 is a diagram for describing an operation example of the detection system in the modification example of the first example embodiment of the present invention.
Figure 6:
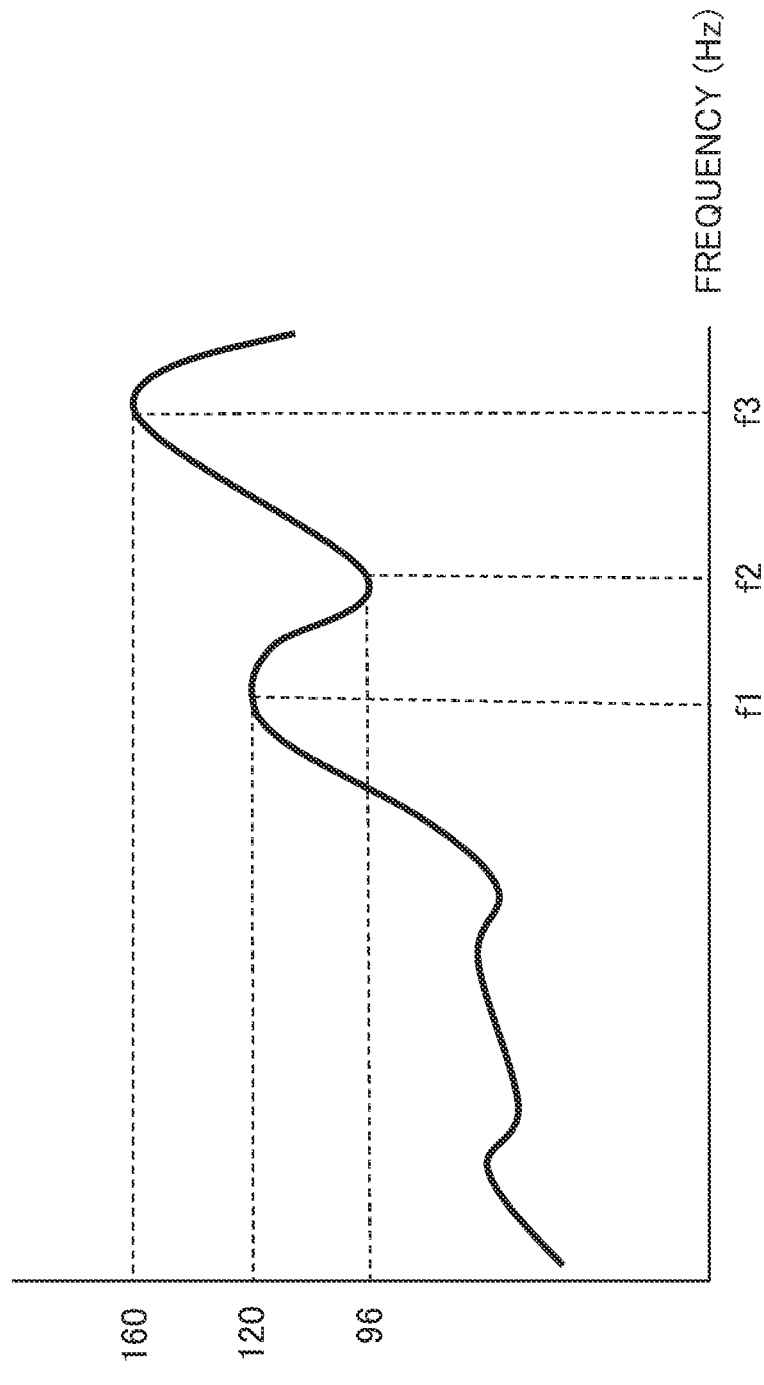
FIG. 6 is a diagram for describing an operation example of the detection system in the modification example of the first example embodiment of the present invention.

With reference to FIGS. 4 to 6, an operation of the detection system 1B is described. FIG. 5 is a flowchart illustrating the operation of the detection system 1B. In the description of the operation example, it is assumed that the specific pattern is the relative values (f1:0.75, f2:0.6) of the amplitudes with respect to the amplitude of the frequency f3, which are acquired from the above-mentioned frequency characteristics illustrated in FIG. 4.

The receiving means 11 receives the optical signal from the fiber-optic cable 20 (S301).

The detection means 12 determines whether the vibration included in the received optical signal includes the vibration having the specific vibration pattern (S302).

For example, the detection means 12 acquires frequency characteristics of vibration applied to the fiber-optic cable 20, from the received optical signal. FIG. 6 is a diagram illustrating one example of the frequency characteristics of the vibration applied to the fiber-optic cable 20. The detection means 12 acquires a vibration pattern associated with the specific pattern, from the acquired frequency characteristics. Specifically, the detection means 12 acquires the relative values (f1:0.75, f2:0.6) of the amplitude (120 nm) of the frequency f1 and the amplitude (96 nm) of the frequency f2 with respect to the amplitude (160 nm) of the frequency f3, as the vibration pattern. In this manner, in this example, the vibration pattern matches with the specific pattern, and thus the detection means 12 determines that the vibration included in the received optical signal includes the vibration having the specific vibration pattern (Yes in S302). Meanwhile, when the vibration pattern is different from the specific pattern, the detection means 12 determines that the vibration included in the received optical signal does not include the vibration having the specific vibration pattern (No in S302).

When the detection means 12 determines that the vibration having the specific vibration pattern is not included (No in S302), the detection system 1B terminates the operation. Further, the detection system 1B may repeat the processing in S301.

The detection means 12 detects submersion of the fiber-optic cable 20, based on magnitude of the vibration having the specific vibration pattern (S303). Specifically, when an amplitude at a frequency included in the vibration pattern acquired in S302 exceeds a predetermined threshold value, the detection means 12 detects submersion. For example, in the example illustrated in FIG. 6, when the amplitude of the vibration at the frequency f3 exceeds 100, the detection means 12 detects submersion.

Note that, the detection system 1B may detect submersion of the fiber-optic cable 20 in combination with the processing of the detection system 1A, based on an increase of the vibration having the specific vibration pattern.

In this manner, the detection means 12 detects submersion of the fiber-optic cable 20, based on the vibration having the specific vibration pattern from the vibration detected by the fiber-optic cable 20.

When submersion is detected based on the vibration applied to the fiber-optic cable 20, it is preferred that the amplitude and the frequency of the vibration output from the vibration source be unchanged. However, when an external disturbance (an operation sound generated from newly started construction or the like) is additionally generated in the periphery of the fiber-optic cable 20, the vibration applied to the fiber-optic cable 20 is increased even without submersion, which may lead to erroneous detection of submersion. In contrast, the detection system 1B detects submersion, based on the vibration having the specific vibration pattern from the vibration detected by the fiber-optic cable 20, and thus an influence of an external disturbance can be suppressed, which enables more accurate detection of submersion.

Second Example Embodiment

Figure 7:
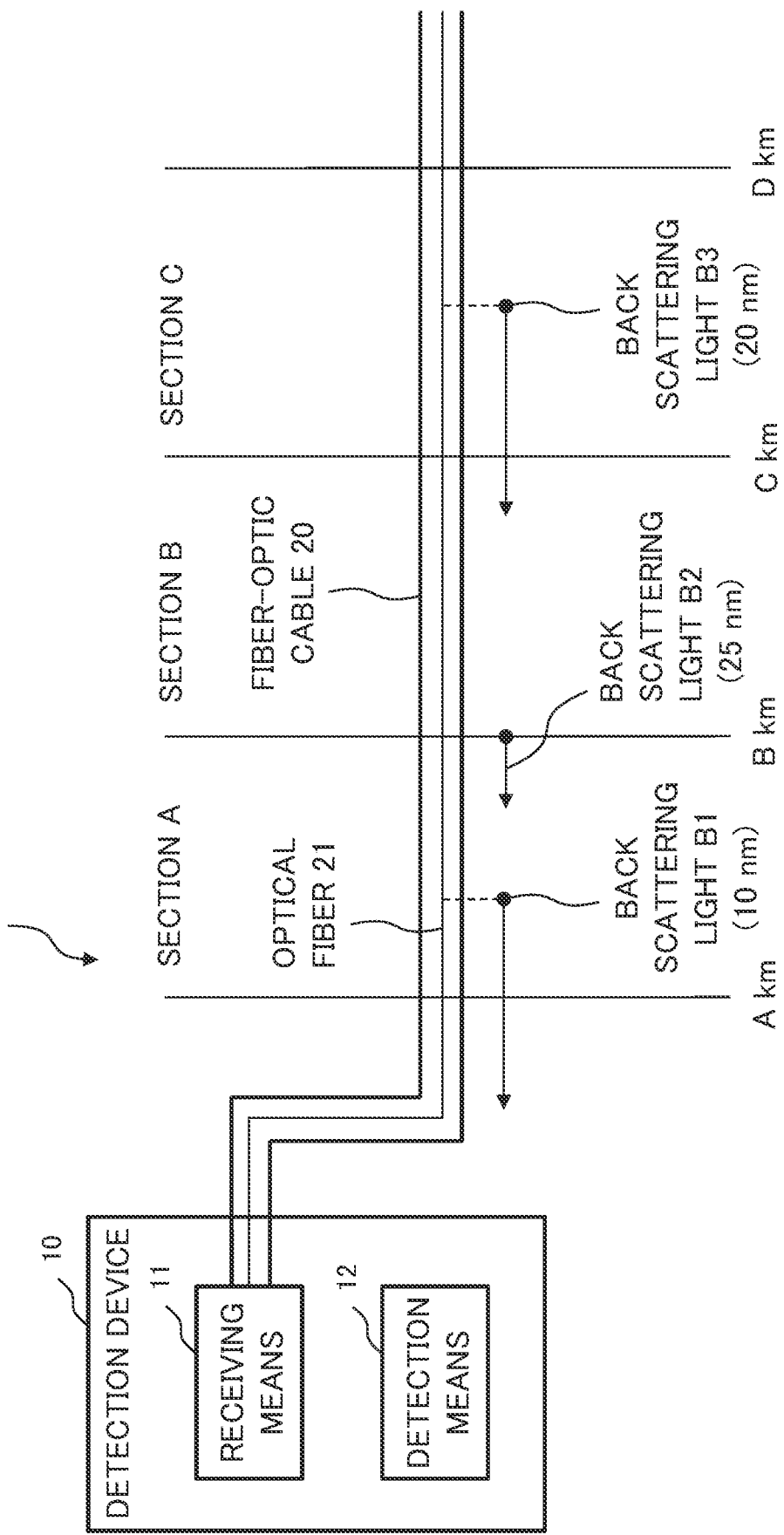
FIG. 7 is a block diagram illustrating a configuration example of a detection system according to a second example embodiment of the present invention.

A detection system 2 according to a second example embodiment is described with reference to FIG. 7. FIG. 7 is a block diagram illustrating a configuration example of the detection system 2. The detection system 2 includes a configuration similar to the configuration of the detection system 1 illustrated in FIG. 1.

The receiving means 11 of the detection system 2 includes functions of the receiving means 11 of the detection system 1. The receiving means 11 receives an optical signal including vibration at a plurality of positions in the fiber-optic cable 20. Specifically, the receiving means 11 receives backscattering light (optical signal) generated from pulse light at each position in the optical fiber 21. It is assumed that the pulse light is output from the light source (not illustrated).

The detection means 12 of the detection system 2 specifies a position at which submersion has occurred from the plurality of positions in the fiber-optic cable 20, based on the vibration at the plurality of positions in the fiber-optic cable 20. As illustrated in FIG. 8, the detection means 12 stores a table in which a propagation time period, which lasts from the time at which the light source outputs the pulse light to the time at which the backscattering light is received, is associated with a distance from the detection device 10 in the optical fiber 21 (a position in the optical fiber 21), a section, and a threshold value.

Moreover, the detection means 12 specifies the position at which the backscattering light is generated in the optical fiber 21, based on the propagation time period. For example, the detection means 12 specifies that the generation position is farther away from the detection device 10 as the backscattering light has a longer propagation time period. With this, the detection means 12 specifies a distance from the detection device 10, based on the propagation time period of the received backscattering light. Further, the detection means 12 specifies a section and a threshold value associated with the specified distance from the table as illustrated in FIG. 8. Further, when the vibration indicated with the received backscattering light exceeds the specified threshold value, the detection means 12 detects submersion at the position away therefrom by the specified distance.

When the vibration at the specified position in the fiber-optic cable 20 satisfies a condition (threshold value) associated with the position as described above, the detection means 12 detects submersion. Specifically, the detection means 12 detects submersion at a first position in the fiber-optic cable 20 when vibration at the first position satisfies a first condition, and detects submersion at a second position in the fiber-optic cable 20 when vibration at the second position satisfies a second condition.

Figure 9:
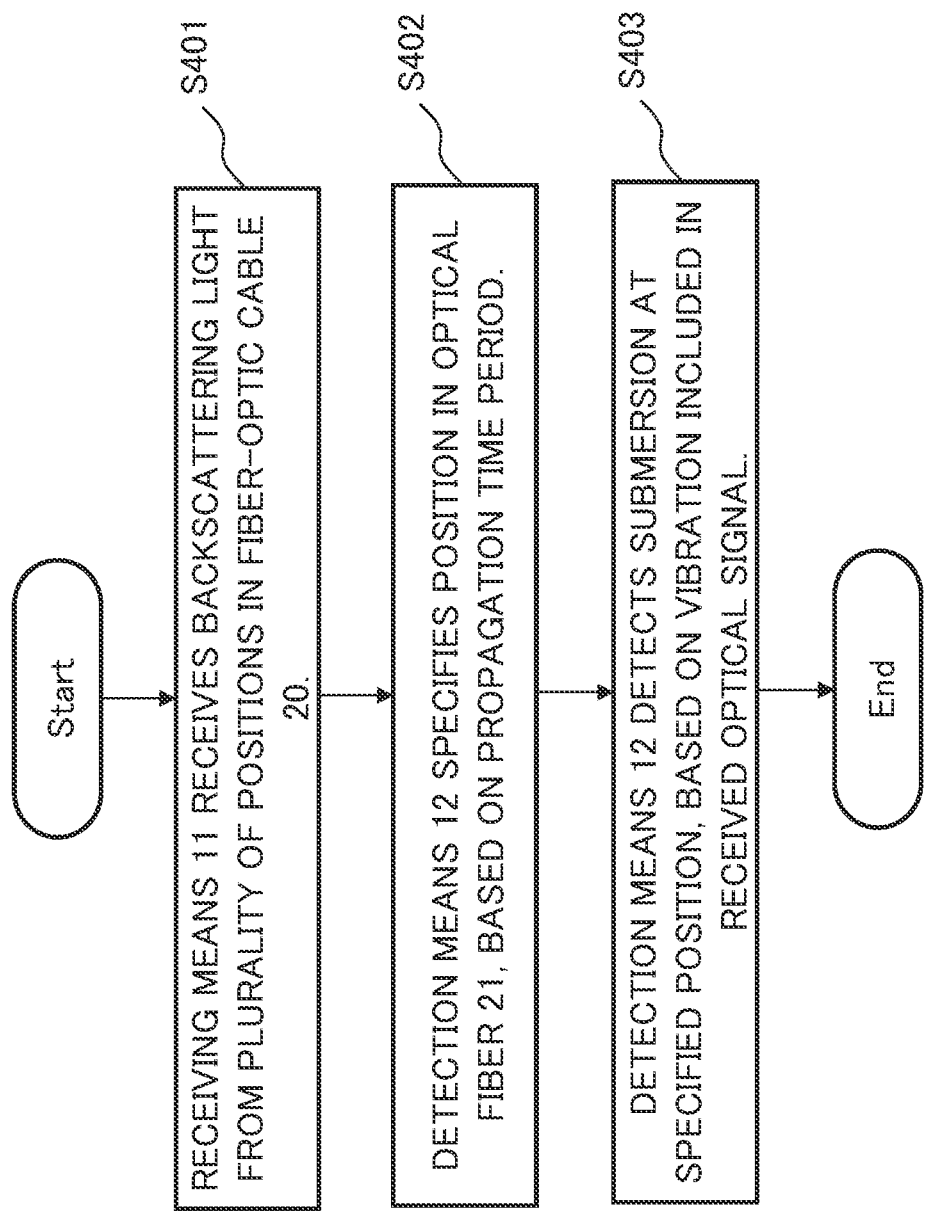
FIG. 9 is a diagram for describing an operation example of the detection system according to the second example embodiment of the present invention.

Next, with reference to FIG. 9, an operation of the detection system 2 is described.

The receiving means 11 receives backscattering light having different propagation time periods, from the plurality of positions in the fiber-optic cable 20 (S401). For example, as illustrated in FIG. 7, backscattering light B1, B2, and B3 are received. For example, the receiving means 11 receives the backscattering light B2 during a propagation time period t2.

The detection means 12 specifies a position at which the backscattering light is generated in the optical fiber 21, based on each of the propagation time periods (S402). For example, the detection means 12 specifies that the position at which the backscattering light B2 is generated is a position away from the detection device 10 by a distance of B km, based on the propagation time period t2.

The detection means 12 detects submersion at each position in the fiber-optic cable 20, based on the vibration included in each backscattering light (S403). For example, as illustrated in FIG. 7, it is assumed that the amplitude of the vibration indicated with the backscattering light B2 is 25 nm. In this case, the detection means 12 follows the table illustrated in FIG. 8, and detects submersion, based on the threshold value associated with each of the propagation time periods. In the example of FIGS. 7 and 8, the amplitude (25 nm) of the vibration indicated with the backscattering light B2 exceeds the threshold value (15 nm) associated with the propagation time period of the backscattering light B2, and thus the detection means 12 detects submersion at the location of B km.

Note that a similar threshold value may be used with respect to the plurality of positions in the optical fiber 21. Further, similarly to the detection system 1A, the detection system 2 may detect submersion, based on an increase of the vibration. In this case, the threshold value is an increased amount of the vibration. Further, similarly to the detection system 1B, the detection system 2 may detect submersion, based on the vibration having the specific vibration pattern. In this case, the threshold value is magnitude of the vibration having the specific vibration pattern or an increase of the vibration having the specific vibration pattern.

In this manner, the receiving means 11 receives the optical signal including the vibration at the plurality of positions in the fiber-optic cable 20. The detection means 12 specifies the position at which submersion has occurred in the fiber-optic cable 20 from the plurality of positions, based on the vibration at the plurality of positions in the fiber-optic cable 20. As a result, the detection system 2 is capable of specifying a submersion position in the fiber-optic cable 20.

Moreover, the detection means 12 detects submersion at the first position in the fiber-optic cable 20 when the vibration at the first position satisfies the first condition, and detects submersion at the second position in the fiber-optic cable 20 when the vibration at the second position satisfies the second condition.

Depending on a range in which the fiber-optic cable 20 is laid, magnitude of the vibration applied to the fiber-optic cable 20 differs according to a position. For example, vibration is larger at an installation position near a railroad of a train than vibration at an installation position in a residential area. In such a case, magnitude of vibration after submersion differs according to a position, thus it is preferred that a condition be set differently according to a position for accurate detection of submersion. In the detection system 2, the detection means 12 detects submersion under different conditions according to positions as described above, and hence submersion can be detected more accurately.

Third Example Embodiment

Figure 10:
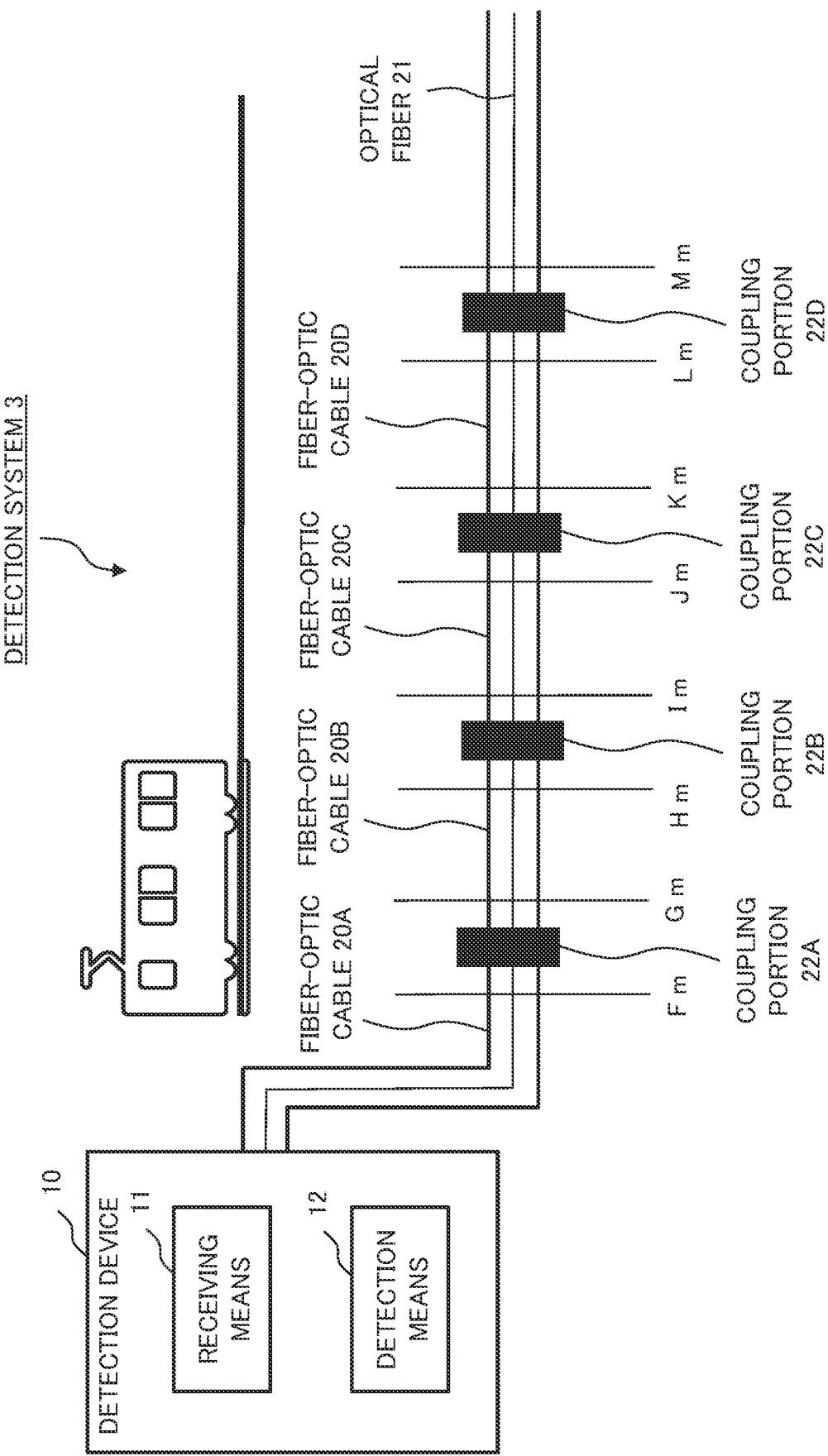
FIG. 10 is a diagram for describing a detection system according to a third example embodiment of the present invention.

A detection system 3 according to a third example embodiment is described with reference to FIG. 10. FIG. 10 is a block diagram illustrating a configuration example of the detection system 3. The detection system 3 includes a configuration similar to the configuration of the detection system 2 illustrated in FIG. 1.

As illustrated in FIG. 10, the detection system 3 includes a plurality of fiber-optic cables 20A, 20B, 20C, and 20D. Further, the detection system 3 includes coupling portions 22A, 22B, 22C, and 22D. As illustrated in FIG. 10, the plurality of fiber-optic cables 20 are coupled to one another through intermediation of the coupling portions. In the coupling portion 22, the plurality of fiber-optic cables 20 are coupled to one another by fusion splicing, for example. The coupling portion 22 is a closure, for example.

Further, as illustrated in FIG. 10, the plurality of fiber-optic cables 20 are laid along a railroad of a train. Vibration along with travelling of a train is applied to the fiber-optic cable 20.

The detection means 12 of the detection system 3 has a table as illustrated in FIG. 11, in which a propagation time period t, a distance from the detection device 10 in the fiber-optic cable 20 (a position in the fiber-optic cable 20), the coupling portions 22 are associated with one another.

Figure 12:
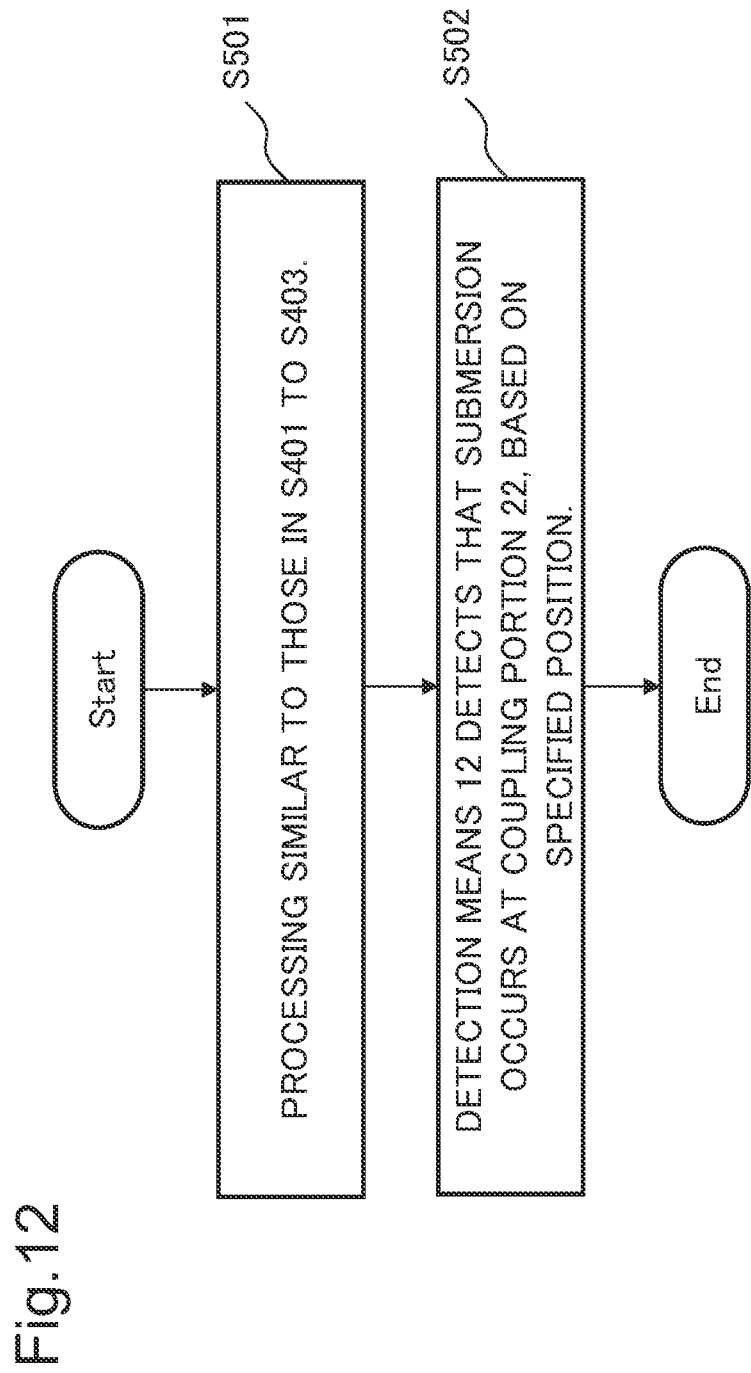
FIG. 12 is a diagram for describing an operation example of the detection system according to the third example embodiment of the present invention.

Next, with reference to FIG. 12, an operation of the detection system 3 is described.

The detection system 3 executes processing similar to those in S401 to S403 in the detection system 2 (S501). With this, the detection means 12 detects that submersion has occurred at the specified position.

The detection means 12 detects that submersion has occurred at the coupling portion 22, based on the specified position (S502). Specifically, the detection means 12 specifies the coupling portion, based on the table as illustrated in FIG. 11, in which the propagation time period t, the position in the fiber-optic cable 20, and the coupling portions 22 are associated with one another. For example, when submersion is detected at a position in the fiber-optic cable 20, which is away from the detection device 10 by H m to 1 m, the detection means 12 specifies the coupling portion 22B. Note that the detection means 12 may specify the coupling portion 22, based on the propagation time period.

Note that the detection means 12 may store information (for example, a position) relating to each of the coupling portions 22 in advance. In this case, the detection means 12 may notify cable control facilities of information relating to the specified coupling portion 22.

Note that, similarly to the detection system 1B, the detection means 12 may detect submersion of the fiber-optic cable 20, based on the vibration having the specific vibration pattern from the vibration detected by the fiber-optic cable 20. In this case, it is assumed that the detection means 12 acquires the pattern for specifying the vibration generated from travelling of a train from the vibration applied to the fiber-optic cable 20. For example, in advance, the detection means 12 acquires frequency characteristics of the vibration applied to the fiber-optic cable 20 due to travelling of a train before submersion.

Moreover, as illustrated in FIG. 13, the fiber-optic cable 20 may be provided along a road on which an automobile travels. In this case, it is assumed that the detection means 12 acquires a pattern for specifying the vibration generated from travelling of an automobile from the vibration applied to the fiber-optic cable 20. For example, in advance, the detection means 12 acquires frequency characteristics of the vibration applied to the fiber-optic cable 20 due to travelling of an automobile before submersion.

In this manner, the detection means 12 detects that submersion has occurred at the coupling portion 22, based on the specified position.

In a case in which the fiber-optic cable 20 is laid outdoors, when the coupling portion 22 is submersed, water may enter through the coupling portion 22. According to the detection system 3, it can be detected that submersion has occurred at the coupling portion 22 before water enters the inside of the fiber-optic cable 20. With this, when the coupling portion 22 is submersed, maintenance work can be performed before water enters the inside of the fiber-optic cable 20 through the coupling portion 22.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-225541, filed on Dec. 13, 2019, the disclosure of which is incorporated herein in its entirety by reference.

The whole or a part of the example embodiments disclosed above can be described as, but not limited to, the following supplementary notes.

(Supplementary Note 1)
A detection device including:
receiving means for receiving an optical signal including vibration detected by a fiber-optic cable; and
detection means for detecting submersion of the fiber-optic cable, based on the vibration included in the optical signal.

(Supplementary Note 2)
The detection device according to Supplementary Note 1, wherein the detection means detects submersion of the fiber-optic cable, based on an increase of the vibration.

(Supplementary Note 3)
The detection device according to Supplementary Note 2, wherein the detection means detects submersion of the fiber-optic cable, based on vibration having a specific vibration pattern from the vibration.

(Supplementary Note 4)
The detection device according to any one of Supplementary Notes 1 to 3, wherein
the receiving means receives an optical signal including vibration at a plurality of positions in the fiber-optic cable, and
the detection means specifies a position at which submersion occurs in the fiber-optic cable from among the plurality of positions, based on vibration at the plurality of positions.

(Supplementary Note 5)
The detection device according to Supplementary Note 4, wherein
the detection means
detects submersion at a first position in the fiber-optic cable when vibration at the first position satisfies a first condition, and
detects submersion at a second position in the fiber-optic cable when vibration at the second position satisfies a second condition.

(Supplementary Note 6)
The detection device according to Supplementary Note 4 or 5, wherein
the receiving means receives an optical signal including vibration detected by a plurality of the fiber-optic cables that are coupled to one another by a coupling portion, and
the detection means detects that submersion occurs at the coupling portion, based on the position being specified.

(Supplementary Note 7)
A detection system including:
the detection device according to any one of Supplementary Notes 1 to 6; and
the fiber-optic cable.

(Supplementary Note 8)
A detection method including:
detecting vibration by a fiber-optic cable;
receiving an optical signal including the vibration detected by the fiber-optic cable; and
detecting submersion of the fiber-optic cable, based on the vibration included in the optical signal.

(Supplementary Note 9)
The detection method according to Supplementary Note 8, further including detecting submersion of the fiber-optic cable, based on an increase of the vibration.

(Supplementary Note 10)
The detection method according to Supplementary Note 8 or 9, further including detecting submersion of the fiber-optic cable, based on vibration having a specific vibration pattern from the vibration.

(Supplementary Note 11)
The detection method according to any one of Supplementary Notes 8 to 10, further including:
receiving an optical signal including vibration at a plurality of positions in the fiber-optic cable; and
specifying a position at which submersion occurs in the fiber-optic cable from among the plurality of positions, based on vibration at the plurality of positions.

(Supplementary Note 12)
The detection method according to Supplementary Note 11, further including:

detecting submersion at a first position in the fiber-optic cable when vibration at the first position satisfies a first condition; and detecting submersion at a second position in the fiber-optic cable when vibration at the second position satisfies a second condition.

(Supplementary Note 13)

The detection method according to Supplementary Note 11 or 12, further including:

detecting vibration by a plurality of the fiber-optic cables that are coupled to one another by a coupling portion; and detecting occurrence of submersion at the coupling portion, based on the position being specified.

REFERENCE SIGNS LIST 1, 1A, 1B, 2, 3 Detection system
10 Detection device
11 Receiving means
12 Detection means
20, 20A, 20B, 20C, 20D Fiber-optic cable
21 Optical fiber
22, 22A, 22B, 22C, 22D Coupling portion

What is claimed is:

1. A detection device comprising:
   a receiver configured to receive an optical signal including vibration detected by a fiber-optic cable; and
   a detector configured to detect submersion of the fiber-optic cable, based on the vibration included in the optical signal, wherein
   the receiver receives an optical signal including vibration at a plurality of positions in the fiber-optic cable, and
   the detector
      specifies a position at which submersion occurs in the fiber-optic cable from among the plurality of positions, based on vibration at the plurality of positions,
      detects submersion at a first position in the fiber-optic cable when vibration at the first position satisfies a first condition, and
      detects submersion at a second position in the fiber-optic cable when vibration at the second position satisfies a second condition.

2. The detection device according to claim 1, wherein the detector detects submersion of the fiber-optic cable, based on an increase of the vibration.

3. The detection device according to claim 2, wherein the detector detects submersion of the fiber-optic cable, based on vibration having a specific vibration pattern from the vibration.

4. A detection system comprising:
   the detection device according to claim 1; and
   the fiber-optic cable.

5. A detection device comprising:
   a receiver configured to receive an optical signal including vibration detected by a fiber-optic cable; and
   a detector configured to detect submersion of the fiber-optic cable, based on the vibration included in the optical signal, wherein
   the receiver receives an optical signal including vibration at a plurality of positions in the fiber-optic cable,
   the detector specifies a position at which submersion occurs in the fiber-optic cable from among the plurality of positions, based on vibration at the plurality of positions,
   the receiver receives an optical signal including vibration detected by a plurality of the fiber-optic cables that are coupled to one another by a coupling portion, and
   the detector detects that submersion occurs at the coupling portion, based on the position being specified.

6. A detection method comprising:
   detecting vibration by a fiber-optic cable;
   receiving an optical signal including the vibration detected by the fiber-optic cable;
   detecting submersion of the fiber-optic cable, based on the vibration included in the optical signal;
   receiving an optical signal including vibration at a plurality of positions in the fiber-optic cable;
   specifying a position at which submersion occurs in the fiber-optic cable from among the plurality of positions, based on vibration at the plurality of positions;
   detecting submersion at a first position in the fiber-optic cable when vibration at the first position satisfies a first condition; and
   detecting submersion at a second position in the fiber-optic cable when vibration at the second position satisfies a second condition.

7. The detection method according to claim 6, further comprising detecting submersion of the fiber-optic cable, based on an increase of the vibration.

8. The detection method according to claim 6, further comprising detecting submersion of the fiber-optic cable, based on vibration having a specific vibration pattern from the vibration.

9. The detection method according to claim 6, further comprising:
   detecting vibration by a plurality of the fiber-optic cables that are coupled to one another by a coupling portion; and
   detecting occurrence of submersion at the coupling portion, based on the position being specified.

* * * * *